United States Patent Office 3,584,069
Patented June 8, 1971

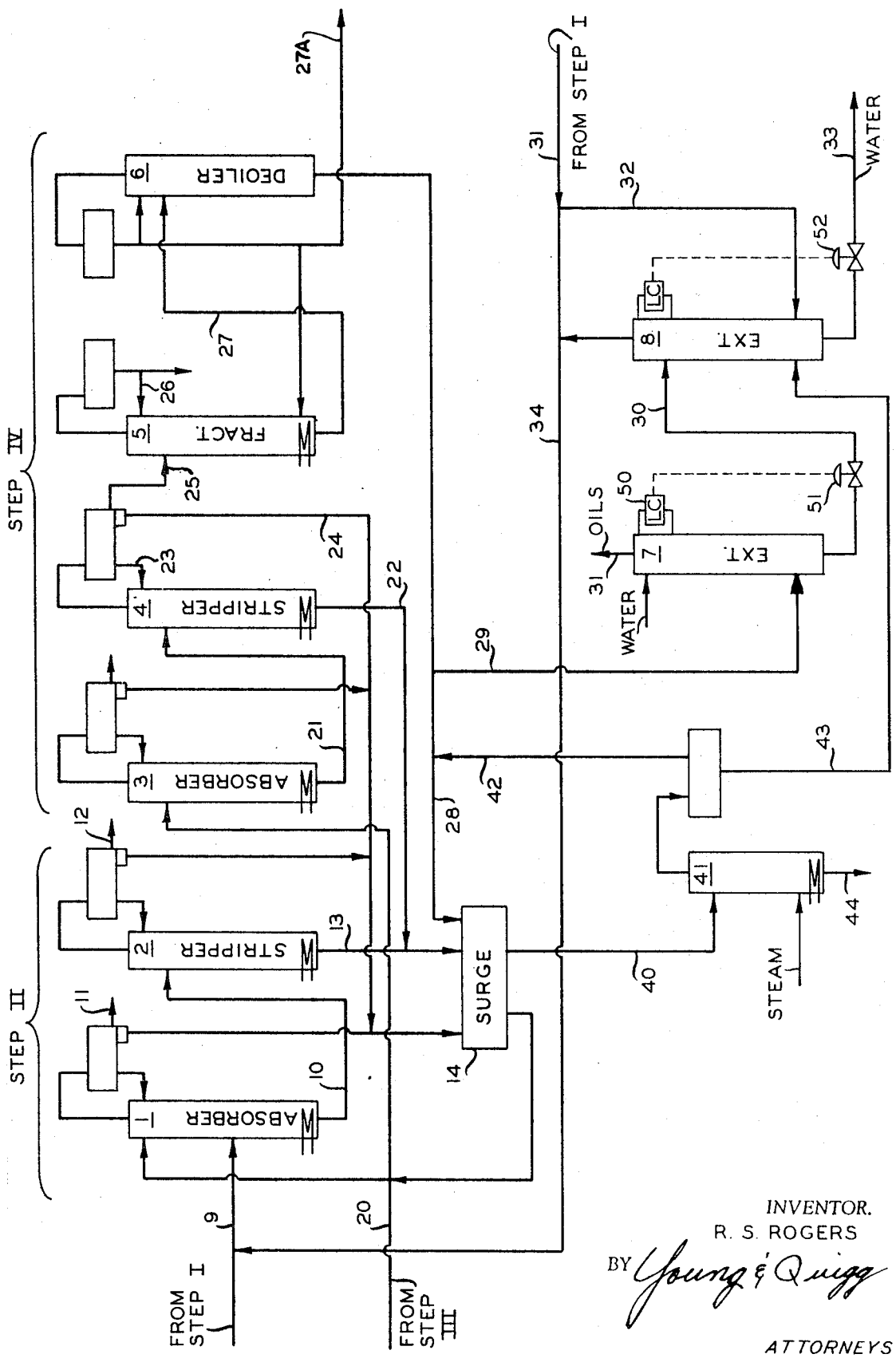

3,584,069
EXTRACTION OF FURFURAL FROM AROMATIC DE-OILER KETTLE PRODUCT IN BUTADIENE DISTILLATION
Ronald S. Rogers, Bartlesville, Okla., assignor to
Phillips Petroleum Company
Filed June 28, 1968, Ser. No. 740,990
Int. Cl. C07c 7/00; C07d 5/22
U.S. Cl. 260—681.5                              7 Claims

ABSTRACT OF THE DISCLOSURE

There are treated, to recover furfural therefrom, aromatic oils which are unavoidably obtained in the production of butadiene which involves cracking of butane to butenes, dehydrogenation of butenes to butadiene and recovery of butadiene by absorption, stripping and distillation employing furfural to absorb the butadiene, followed by de-oiling of an aromatic oils bottoms containing furfural obtained from a butadiene recovery column obtaining said aromatic oils. The oils are treated with water to recover furfural therefrom following which the water containing furfural is stripped employing a hydrocarbon, for example, the hydrocarbon feed containing butane and butenes passing to the absorber, in which butenes are absorbed for later conversion to butadiene, thus to recover from the water the furfural therein contained. Control of the oils in the furfural in the over-all operation of recovery of butadiene is accomplished by adjusting the overhead temperature of a stripper in which butenes and butadiene was separated from furfural together with said oils from a bottoms which contains furfural and which are reused in the recovery operation and/or by adjusting the relative proportion of furfural from the deoiling of the butadiene recovery which are reused relative to bottoms which are treated according to the invention. Method and apparatus are described.

This invention relates to the recovery of furfural as used in the production of butadiene. This invention also relates to the production of butadiene. More particularly, it relates to the treatment of an aromatic oil resulting from the operation of an absorber-stripper and a butadiene distillation column wherein in the absorber the butadiene is absorbed employing furfural; furfural, light aromatic oils, butene and butadiene are recovered as an overhead in a stripper in which the furfural is stripped, the overhead is distilled to obtain butadiene as an overhead and aromatic oils containng furfural and butene as bottoms, the bottoms treated to recover oils and furfural as separate streams therefrom.

In one of its concepts, the invention, broadly speaking, contemplates that water washing can accomplish the separation of furfural from aromatic oils.

In another of its concepts, the invention provides a method for the recovery of furfural and aromatic oils extant in the bottoms of a column, in which a feed, containing furfural, aromatic oils, butene-2 and butadiene, is distilled to recover substantially pure butadiene therefrom as an overhead and a bottoms containng butene-2, furfural and aromatic oils, by first separating butene-2 from the bottoms and second, treating said bottoms with water, as in a liquid full extraction zone, to separate in a water phase in a batch or continuous manner, furfural from said aromatic oils, and in an oil phase the said aromatic oils, following which the water phase is stripped of its furfural content by treatment with a butadiene containing feed to the operation or some similarly functioning hydrocarbon.

In still another of its concepts, the invention provides a process for maintaining a constant concentration of oils in the furfural used in an extractive distillation of butadiene, from a butadiene containing stream produced in a conventional manner from butane and/or butenes, by water washing of furfural from said oils, which are highly aromatic in character, and then removing from the wash water furfural employing a hydrocarbon, thus recovering furfural without having to discard any furfural; i.e., a sufficient amount of furfural can be separated from the aromatic oils that the concentration of said oils in the recovered furfural, which is reused in the extractive distillation, is maintained at an acceptable, relatively speaking, low value; a suitable hydrocarbon to remove the furfural from the wash water can be and preferably now is, the feed to Step II of a conventional butadiene production operation as described herein. However, the hydrocarbon feed to Step IV can be used to remove the furfural from the wash water.

There is no way of predicting how a component will be distributed between two immiscible liquids. Nor can it be predicted how rapidly a component will pass from one liquid phase to another liquid phase. In short, tests are required to obtain this information. This will be so even though the solubility of the component in each separate phase may be known.

Further, for operation on an economically feasible basis, it is necessary to know, and this cannot be predicted, what will be the equilibrium of the solubility of a component between two liquid phases. Thus, equilibrium data must be determined so that two major principles which are involved, can be considered to determine the commercial possibility of separation by solvent extraction of a component from a first liquid employing a second liquid phase for this purpose. Thus, phase equilibrium relationships, which will describe the concentrations of the component in the respective two phases and the rates of extraction and diffusion which, importantly, depend upon the departure from equilibrium which will exist in the system, including physical characteristics of the liquids, must be determined before feasibility of the operation becomes obvious.

It has occurred to me that it might be possible, upon suitable investigation made, to use a water extraction to recover furfural from aromatic oils, indeed highly aromatic oils, in which it is contained and in which, therefore, it is pre-eminently soluble. Further, it occurred to me that the furfural could then be recovered from the water by use of a suitable hydrocarbon.

Still further, I have found by actual testing, that it is possible to maintain in the furfural being used, without loss of furfural, a relatively low desired concentration of aromatic oils while using the furfural for extractive distillation as practiced in the recovery of butadiene. It will be understood by one skilled in the art in possession of this disclosure that in using furfural to recover butadiene, there are formed furfural polymers. These polymers are also found in bottoms. There can exist in the furfural, as used with increased efficiency, about 12 percent of the aromatic oils, 8 percent of water and approximately 0.1 to about 0.5 percent polymerized furfural polymers. The build-up of furfural polymers which are usually heavy, black and tarry in appearance and consistency is to be avoided because these have a tendency to foul heat exchangers and interfere with the efficient esparation of the various hydrocarbons. Further, the higher the concentration of polymers in the system the faster will form furfural polymers. Further information with respect to furfural polymers and a method for dealing with such polymers is described and claimed in application for Pat. Ser. No. 567,469, filed July 25, 1966, John M. Folz, "Furfural Recovery," now Pat. No. 3,432,569, issued Mar. 11, 1969. The information of the application file is incorporated herein by reference.

It is an object of this invention to produce butadiene. It is another object of this invention to recover furfural for use in the recovery of butadiene from a stream containing the same. A further object of the invention is to provide an improved furfural recovery operation within a butadiene production operation such that aromatic oils concentration, and as the case may be, furfural polymer concentration in the furfural cycling in the process, can be kept at an acceptable low concentraton in an economically feasible manner. Still another object of the present invention is to provide a combination operation wherein furfural is recovered from an aromatic oils containing deoiler kettle bottoms resulting from a butadiene distillation column from which butadiene is recovered from a stream containing the same in a highly purified form.

Other aspects, concepts and objects of this invention are apparent from a study of this disclosure, the drawing, and the appended claims.

According to the present invention, in one of its broad concepts, there is provided a method for the recovery of furural from aromatic oils, contained in deoiler kettle bottoms in a butadiene production operation, which comprises extracting said bottoms with water to remove furfural therefrom. Further according to the invention, the water containing furfural is now treated to extract the furfural therefrom employing a suitable hydrocarbon, which, in the preferred form of the invention, is at least a component of a feed in the over-all operation.

Suitable hydrocarbons are butane, butenes and butadiene. Another hydrocarbon is constituted by a butane-butenes stream in the overall operation which, after it has been used to extract furfural from the water, will be fed to an absorber in the operation as at least part of a feed thereto. This is now preferred. When butadiene and butenes constitute the suitable hydrocarbon for recovery of the furfural from the water, these hydrocarbons containing furfural will be used at least as part of a feed in that part of the overall butadiene operation in which butadiene and butenes are absorbed. In these instances, it will be seen the recovered furfural reenters the operation while the oils have been, at least to an extent, separated from the operation.

Referring to the drawing, there is shown diagrammatically a flow plan of a butadiene production operation. There are in the drawing illustrated, for purposes of better understanding that part of the operation surrounding or embodying the inventive concepts here sought to be patented, Steps II and IV of a four step butadiene production operation in which Step I (not shown for sake of simplicity) is employed to convert butane to butenes. Step II is employed to separate butenes from butane. Step III (not shown for sake of simplicity) is employed to convert butenes to butadiene and Step IV includes the separation and recovery of butadiene. While herein, and more especially in connection with the drawing, streams are referred to as containing one or more materials or components, it will be clear to one skilled in the art that there may be other components which, for sake of brevity, are not mentioned. Similarly, some details of operation, equipment, controls, conditions, etc., have been omitted for sake of brevity, and can be supplied by one skilled in the art having studied this disclosure.

Referring now to the drawing, butane and butenes from a Step I operation enter an extractive distillation absorber column 1 via 9. Absorber 1 functions as indicated to separate butenes from butane, the butenes being absorbed employing furfural and being removed from absorber 1 and passed by 10 to stripper 2. Overhead from absorber 1 contains butane which is removed at 11 and returned to Step I. Stripper 2 butenes are separated in known manner and passed by 12 to Step III. Bottoms from the stripper are passed by 13 to furfural surge 14. A converted stream containing butadiene and butenes and some butane from Step III is passed by 20 into an extractive distillation absorber 3 wherein butadiene, butenes, some butane and other components including components, ultimately resulting in an aromatic oil phase and furfural polymers, are absorbed and passed by 21 to stripper 4. The overhead from stripper 4 will contain the butadiene along with some of the other components mentioned as known in the art. Though some oils are stripped in stripper 4, not all of the aromatics are stripped from the furfural that passes from the bottom of column 4 by 22 into surge 14.

The rate at which oils are stripped from the furfural in 4 and received as overhead product from column 7, later described, is regulated in this embodiment to control concentration of aromatic oils in the furfural surge tank at about 12 percent. If the concentration of oils in the furfural in the tank increases substantially above about 12 percent, the overhead temperature of column 4 is increased so that more of the aromatic oils will be carried overhead from column 4 and eventually will be eliminated from the system as overhead product from column 7.

With this understanding, it will be seen that overhead from stripper 4 after separation of a reflux stream and some water, which are passed respectively by 23 to column 4 and 24 to surge 14, is passed by 25 to butadiene recovery column 5 from which butadiene is recovered as a highly purified stream 26. Bottoms from column 5 are passed by 27 to de-oiler column 6 from which butene-2 and some oil are removed as overhead by 27a. Bottoms from the de-oiler are passed in part by 28 to surge 14, and by 29 to water extraction column 7. Column 7 is usually maintained liquid full. According to the invention, water is passed into the upper portion of column 7. A downward wash-extraction of furfural results in a water phase removed from the bottom of the column by 30 and an oil phase taken overhead by 31. The water phase is passed to column 8 in which it is upwardly extracted with a mixture of a butane-butene feed entering the operation by 31 and passed at least in part by 32 to a lower portion of column 8. Water is discarded at 33 at the foot of column 8 while furfural containing butane-butene feed is passed by 34 into 9 and then into absorber 1. A portion of the contents of surge 14 is passed by 40 into steam stripper 41 wherein surge 14 liquid is steam stripped overhead being returned in part by 42 and 28 to surge 14 and the water phase separated therefrom passed by 43 to the foot of column 8. Heavy furfural polymers which are to be distinguished from furfural and from the aromatic oils are removed from the system at 44.

The indication of some flow controller recorders and some valves and other apparatus, components or conditions or flow rates, is simply to facilitate the study of the disclosure of the invention and is not to be taken as excluding other which have been omitted for sake of brevity. Water lines from the bottoms of provided water phase separators operative upon the overheads of absorber 1, stripper 2, absorber 3, stripper 4 and deoiler 6 have been included to generally show that these water phases can be returned to surge 14 or otherwise treated to more fully recover furfural as it is desirable to do. In most cases, again, these lines have been diagrammatically shown simply to aid in the further comprehension of the embodiment described.

The following data are additionally included to aid in a more full understanding of the embodiment specified in the drawing.

TABLE

| | | |
|---|---|---|
| Column 1 | 300° F. bottom temperature; 220,000 g.p.j. furfural feed; 30,000 g.p.h. feed (70% C$_4$ and 30% C$_4$=). | 120° F. OHV (60 p.s.i.g. top, 90 p.s.i.g. bottom). |
| Column 2 | 305° F. bottom temperature | 120° F. OHV (70 p.s.i.g. top, 80 p.s.i.g. bottom). |
| Column 3 | 280° F. bottom temperature; 60,000 g.p.h. furfural feed (35% C$_4$= =, 5% C$_4$, 60% C$_4$=); 15,000 g.p.h. feed (35% C$_4$= =, 5% C$_4$, 60% C$_4$=); OHP=9,650 g.p.h. butenes. | 120° F. OHV (75 p.s.i.g. top, 110 p.s.i.g. bottom). |
| Column 4 | 305° F. bottom temperature; 60,000 g.p.h.=kettle product; rerun unit= 3,000 g.p.h. feed. | 120° F. OHV (70 p.s.i.g. top, 80 p.s.i.g. bottom). |
| Column 5 | 160° F. bottom temperature; 5,580 g.p.h. feed; 900 g.p.h. of OHP from column 6 recycled to bottom of column 5; 1,230 g.p.h.=removed from kettle. | 120° F. OHV. |
| Column 6 | 280° F. bottom temperature; 1,230 g.p.h. feed; OHP=1,000 g.p.h. of which 900 g.p.h. is recycled to column 5; KP=230 g.p.h. of which 200 g.p.h. is added to furfural surge. | 130° F. OHV. |
| Column 7 | 30 g.p.h. feed (10-20% of feed is furfural); 300 g.p.h. water feed at ambient temperature. | |
| Column 8 | Water-furfural feed from column 7=304 g.p.h.; water-furfural feed from rerun unit 700 g.p.h.; ambient temperature; 8,500 g.p.h. hydrocarbon feed. | |

The aromatic oils or aromatic concentrates which are separated from the operation are compositions of many different hydrocarbons. The composition and identification of these aromatic oils has been found to be difficult with respect to its complexity. Suffice to say that a full identification has not been accomplished. Nevertheless, it is known that these oils are highly aromatic in character and are extremely good solvents for furfural. The problem to recover furfural from these oils, which has been extant for some time now, is pre-eminently solved by practice of the simple operation of the present invention which one skilled in the art in possession of the disclosure will be able to conduct determining for his purposes by more routine tests, whether to depart from the data given here to obtain results which may be particularly more desirable in view of other changes he may have made elsewhere in the overall operations.

With reference to the flows indicated on the drawing, about 0.4 of 1 percent of the furfural entering column 4 is in the overhead product from column 4 and enters as feed to column 5. For intermittent operation, a range of from 0.0 to 5 percent of furfural in the feed to column 5 will usually be found to give satisfactory operation. For continuous operation, the range will be approximately .05 to 1.5 percent.

The concentration of oils in the furfural in surge tank 14 can be intermittently or periodically reduced by operating column 4 at a higher temperature thus to remove by distillation more oils overhead. When this is done, more furfural passes from column 4 in the overhead product, by so separating the concentration of oils in the furfural in the operation can be adjusted or maintained as desired. Further, additionally the concentration of the oils in the furfural can be adjusted by the relative proportions of bottoms from column 6 passing respectively through pipes 28 and 29.

Prior to the present invention, the kettle product of deoiler, column 6, was stored usually until enough had accumulated to nearly fill a storage vessel. The accumulated material was water-washed by spraying water to water extract or wash furfural from the kettle product. This removed about one-half of the furfural. The water was continuously recycled using a limited amount of water. Had more water been used, the concentration of the furfural in the water would have been lower, increasing cost of team required to such an extent that the steam would be more expensive than the cost of an equivalent amount of furfural recovered. Thus, about 5 percent furfural in water is about the lower limit for economically distilling the furfural from the water used to recover it by washing the kettle product as here described. The furfural was removed from the water by azeotropic distillation.

Be it understood by one skilled in the art that in an operation of column 7 there can be employed a water-oil interface controller 50 which is operative to adjust valve 51 in bottoms drawing off line 30. Similarly, an interface controller 52 is operatively connected to valve 53 to control the interface in column 8.

As earlier noted, other apparatus or modifications thereof, though not shown or described, are within the scope of the invention as its concept appears in the appended claims. These oils include, in addition to furfural, a small amount of tarry furfural polymer and C$_4$ dimers.

Patent of interest relating to the production of butadiene and the recovery of furfural are: U.S. 2,414,402, issued Jan. 14, 1947; U.S. 2,436,502, issued Feb. 24, 1948; U.S. 2,523,554, issued Sept. 26, 1950; and U.S. 2,412,823, issued Dec. 17, 1946.

Before the installation of the present invention, which has been found to operate very well, the concentration of oils in the furfural being recycled would build up to a value of about 15-16 percent. When this occurred, stripper 4 was operated for brief periods of time at a higher temperature than usual to drive more oils and furfural overhead. These oils and furfural eventually came out as deoiler 6 bottoms. During the operation to remove the oils, the kettle product of the deoiler was charged to a spare tank. This bottoms contained furfural. When stripper 4 was not being operated at the higher-than-usual temperature, only a very small amount of furfural was present in the overhead product and any excess deoiler kettle product was not needed to keep the oil content up in the furfural at a desired value could be otherwise used; for example, sold as aromatic concentrate.

Reasonable variation and modification are possible within the scope of the foregoing disclosure, the drawing and the appended claims to the invention, the essence of which is that aromatic oils recovered from butadiene production as herein described are intimately contacted with water to separate by extraction, furfural from said oils following which water containing furfural is contacted with hydrocarbon; for example, a butadiene-butenes or a butadiene-butenes feed or other suitable hydrocarbon to recover furfural from the water containing the same and in a presently preferred modification passing the hydrocarbon stream containing the furfural to the operation wherein furfural is used to absorb a hydrocarbon; for example, butenes contained in a butane-butenes stream.

I claim:

1. The recovery of furfural from aromatic deoiler kettle bottoms obtained upon deoiling furfural from which butadiene absorbed therein has been distilled which comprises treating said bottoms with water to form an oil phase and a water phase containing furfural and then treating said water phase with a hydrocarbon effective to remove the furfural from said water.

2. A recovery according to claim 1 wherein the hydrocarbon with which the water phase containing furfural is contacted is a stream containing butane and butenes which are fed to an absorber in the operation to separate butenes which are then recovered and then converted to butadiene.

3. An operation according to claim 1 wherein a stripper is operated to produce from a furfural-butadiene stream an overhead product containing furfural and aromatic oils; the overhead product is passed to a butadiene recovery unit from which butadiene is recovered overhead and a kettle product is removed as bottoms and this kettle product is contacted with water under extraction conditions to remove furfural from the oils and then furfural is recovered from a water phase thus obtained by treating said phase with a hydrocarbon stream passing to an absorber in the operation.

4. An operation according to claim 3 wherein butane is converted to a stream containing butenes, butenes are recovered by furfural absorption, the butenes are recovered from the furfural, the butenes are dehydrogenated to form butadiene, the butadiene is absorbed from the stream containing the same together with butenes employing furfural and upon recovery of the butadiene from the furfural there is recovered from the furfural the said aromatic oil.

5. An operation according to claim 3 wherein the concentration of oil in furfural in a butadiene recovery operation practiced upon streams containing butadienes and butenes and butenes and butadienes and other components is adjusted by adjusting the temperature of the overhead product from said stripper.

6. An operation according to claim 3 wherein the concentration of oil in furfural in a butadiene recovery operation practiced upon streams containing butanes and butenes and butenes and butadienes and other components is adjusted by recycling only a portion of said kettle product to the operation while passing an adjusted portion of said kettle product to a zone in which it is contacted with said water under said extraction conditions.

7. An operation according to claim 3 wherein there is provided a predetermined concentration of oils in the furfural used in an absorber in which the butadiene is absorbed to produce a butadiene-furfural stream which is distilled and wherein when the concentration of oils in the furfural thus used increases, the stripper overhead temperature is increased and vice versa.

References Cited

UNITED STATES PATENTS

| | | | |
|---|---|---|---|
| 2,000,707 | 5/1935 | Manley | 260—347.9 |
| 2,412,823 | 12/1946 | Mayland | 260—347.9 |
| 2,436,502 | 2/1948 | Buell et al. | 260—347.9 |
| 2,523,554 | 9/1950 | Boatright | 260—347.9 |
| 3,432,569 | 3/1969 | Folp | 260—680 |

DELBERT E. GANTZ, Primary Examiner

G. E. SCHMITKONS, Assistant Examiner

U.S. Cl. X.R.

203—43, 58, 62; 208—48; 260—347.9